United States Patent [19]

Joerg et al.

[11] Patent Number: 5,711,396
[45] Date of Patent: Jan. 27, 1998

[54] SERVOMOTOR ASSISTED RACK-AND-PINION STEERING OR CONTROL SYSTEM

[75] Inventors: Wolfgang Joerg, Stuttgart; Jaromir Bordovsky, Berglen; Aydogan Cakmaz, Stuttgart; Hubert Heck, Duesseldorf; Arno Roehringer, Ditzingen; Claus Gall, Fellbach; Reinhold Abt, Neuhausen; Rainer Strauss, Kaarst; Karl-Hans Koehler, Wernau, all of Germany

[73] Assignee: Mercedes-Benz AG, Stuttgart, Germany

[21] Appl. No.: 550,566

[22] Filed: Oct. 31, 1995

[30] Foreign Application Priority Data

Oct. 31, 1994 [DE] Germany ............... 44 38 930.2

[51] Int. Cl.⁶ ..................................................... B62D 5/04
[52] U.S. Cl. ............................................. 180/444; 74/388 PS
[58] Field of Search .............................. 180/443, 444, 180/446, 412; 74/388 PS, 422

[56] References Cited

U.S. PATENT DOCUMENTS

| | | | |
|---|---|---|---|
| 4,241,804 | 12/1980 | Deininger et al. | 180/444 |
| 4,415,054 | 11/1983 | Drutchas | 180/444 |
| 4,416,345 | 11/1983 | Barthelemy | 180/444 |
| 4,593,781 | 6/1986 | Galtier | |
| 4,921,061 | 5/1990 | Asano | |
| 5,040,631 | 8/1991 | Lang et al. | 180/444 |
| 5,209,315 | 5/1993 | Schlagmueller et al. | 180/444 |

FOREIGN PATENT DOCUMENTS

| | | |
|---|---|---|
| 0 148 664 | 7/1985 | European Pat. Off. |
| 37 12 154 | 10/1987 | Germany |
| 38 21 501 | 1/1989 | Germany |
| 746684 | 3/1956 | United Kingdom |
| 1182816 | 3/1970 | United Kingdom |
| WO 92/14640 | 9/1992 | WIPO |

*Primary Examiner*—Brian L. Johnson
*Assistant Examiner*—Gary Savitt
*Attorney, Agent, or Firm*—Evenson McKeown Edwards & Lenahan, PLLC

[57] ABSTRACT

A rack-and-pinion steering or control system with a servomotor, especially an electric motor, which can be coupled to the rack by way of a mechanical transmission and runs continuously in one direction is provided. The rack is designed over a certain area as a screw which interacts with a recirculating ball sleeve which can be driven in two directions of rotation by the motor. To control the direction of rotation, use is made of normally disengaged clutches which can be controlled as a function of a small displacement of the recirculating ball sleeve.

9 Claims, 3 Drawing Sheets

SERVOMOTOR ASSISTED RACK-AND-PINION STEERING OR CONTROL SYSTEM

BACKGROUND AND SUMMARY OF THE INVENTION

The invention relates to a rack-and-pinion steering or control system with a servomotor, especially a rotating electric motor, which can be coupled to the rack by way of a mechanical transmission.

In a rack-and-pinion steering system disclosed in U.S. Pat. No. 4,921,061, an electric motor, which can be driven in rotation, is drivingly connected to a pinion. The pinion meshes with the rack via a clutch which only engages when the motor is running. The electric motor is operated by a control circuit which, depending on the direction of a torque acting in one or the other direction on a steering wheel or the like, drives the motor with a power which matches the torque or, when the torque is decreasing, stops the motor.

German Patent document DE 37 12 154 C2 discloses a rack-and-pinion steering system in which the rack has a section which is designed as a spindle shaft. The spindle shaft interacts with a recirculating ball sleeve driven by an electric motor. As a function of the forces transmitted between the rack and the pinion meshing with it, the electric motor is driven with a controllable force in one direction or the other. This has the result that the recirculating ball sleeve driven in a corresponding manner can exert a greater or lesser force on that section of the rack which is in the form of a spindle shaft in order to assist the respectively desired displacement of the rack.

A functionally similar arrangement is described in German Patent document DE 38 21 501 A1. Here, the electric motor drives a spindle shaft which interacts with a recirculating ball sleeve mounted in torsionally rigid fashion on the rack. The electric motor again is driven in one direction or the other as a function of the forces transmitted to the rack by a pinion.

All the known prior art designs are comparatively expensive insofar as the control circuits for operating the electric motor have to include redundant design for safety reasons. Furthermore, there is the necessity of supplying the electric motor with high electric power in case of peak load if effective servo assistance by the initially stationary motor is to be achieved.

There is therefore needed an improved rack-and-pinion steering system which, in particular, reduces the constructional outlay without any loss in operating safety.

These needs are achieved according to the present invention by virtue of the fact that the rack has arranged on it a non-rotatable screw which can be displaced axially together with the rack. The screw interacts with a recirculating ball sleeve with a limited ability for axial displacement. The axial displacement of the recirculating ball sleeve controls a frictional clutch arrangement which couples one of two wheels, driven continuously in opposite directions by the servomotor, to the recirculating ball sleeve depending on the direction of the axial displacement of the recirculating ball sleeve and, in a central position, holds the recirculating ball sleeve uncoupled from both wheels.

The invention provides two normally separated driving connections between a continuously running servomotor and the rack via which the rack can be driven in opposite directions despite the fact that the servomotor runs continuously in one direction.

A particularly low-friction driving connection is possible by virtue of the coupling of the motor and the rack for driving purposes according to the present invention by the use of a recirculating ball mechanism.

According to a particularly preferred embodiment, the screw is arranged as an extension of the rack and is integrally connected to it. Thus, on the one hand, this makes possible a direct connection between the recirculating ball mechanism and the rack and, on the other hand, allows the recirculating ball mechanism together with the servomotor and the clutch arrangement to be arranged away from a pinion operated by a steering wheel and meshing with the rack. In this manner, it is possible to make optimum use of the space available in motor vehicles.

Other objects, advantages and novel features of the present invention will become apparent from the following detailed description of the invention when considered in conjunction with the accompanying drawings.

DETAILED DESCRIPTION OF THE DRAWINGS

Figure 1:
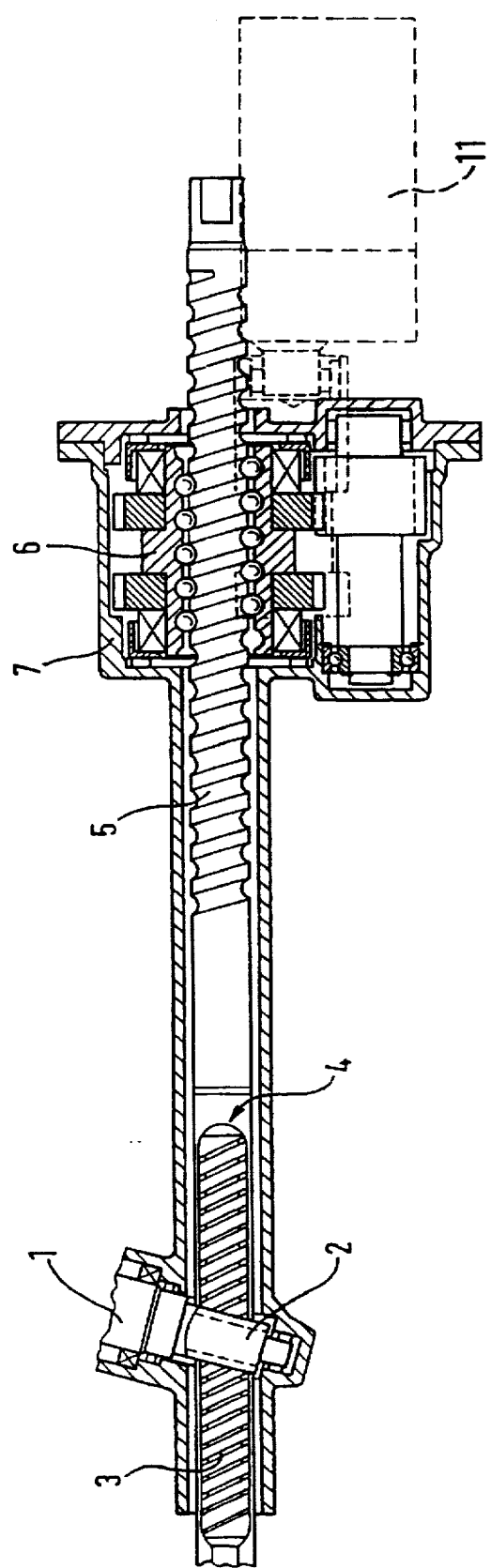
FIG. 1 is a schematic overall view of a rack-and-pinion steering system according to the present invention for motor vehicles.

According to FIG. 1, a steering wheel (not shown) is connected in a known manner to an input shaft 1. A pinion 2 is arranged in a torsionally rigid fashion on the input shaft 1. The pinion 2 meshes with the toothing 3 of a rack 4. Accordingly, the rack 4 is displaced in one axial direction or the other depending on the direction of rotation of the input shaft 1 and the pinion 2. The displacement of the rack 4 is transmitted in a known manner by way of transmission elements (not shown) to the steered wheels (likewise not shown) of a motor vehicle.

According to the invention, an area of the rack 4 adjoining the toothing 3 is designed as a screw 5 which drivingly interacts with a recirculating ball sleeve 6 arranged coaxially on the screw 5. The recirculating ball sleeve 6 is arranged with a limited ability for axial displacement in a stationary housing 7, so that, when the rack 4 is axially displaced, the recirculating ball sleeve 6 is pushed either into one or the other axial end positions within the housing 7.

Figure 2:
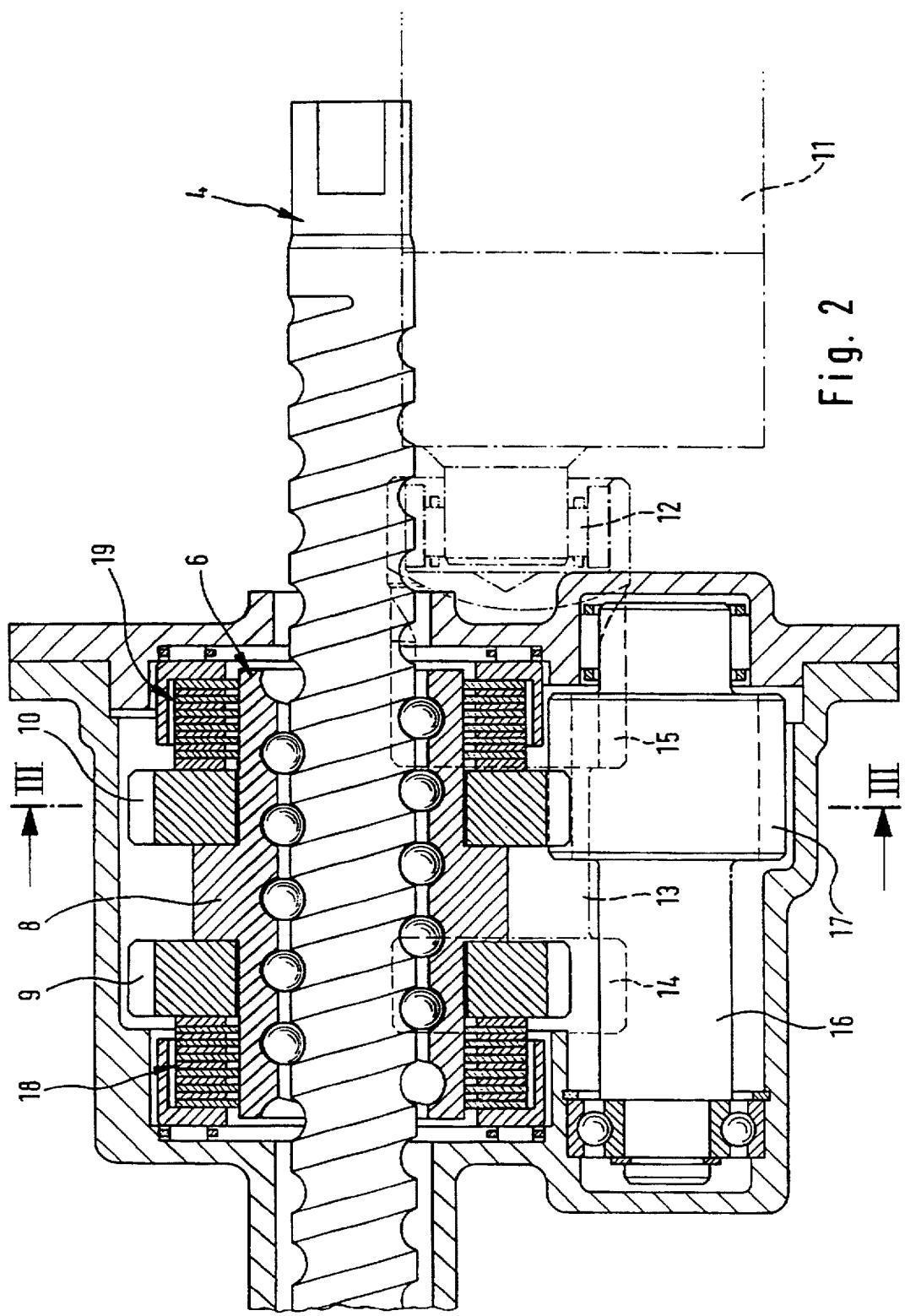
FIG. 2 is an axial section view taken through the servo drive.

Referring to FIG. 2, arranged on the recirculating ball sleeve 6, on both sides of a central annular web 8, are two gearwheels 9 and 10. The gear wheels 9, 10 can be rotated relative to the recirculating ball sleeve 6 and are driven in opposite directions by an electric motor 11 which runs continuously in the same direction, i.e. the gearwheels 9 and 10 rotate continuously in opposite directions.

For this purpose, the electric motor 11 drives, via a freewheel 12, an output shaft 13 which is drivingly connected to gearwheel 9 by a gearwheel 14 arranged on it in a torsionally rigid fashion. Another gearwheel 15 arranged on the output shaft 13 is in engagement with a gearwheel 17 which is arranged on a layshaft 16 and is furthermore in engagement with the gearwheel 10 and has a sufficient axial width for this purpose.

Arranged on the sides of the gearwheels 9 and 10 which face away from the annular web are multi-plate clutches 18 and 19 by which the gearwheels 9 and 10 can be frictionally connected to the recirculating ball sleeve 6. The multi-plate clutch 18 which serves to connect gearwheel 9 to the recirculating ball sleeve 6 for driving purposes is engaged when the recirculating ball sleeve 6 is displaced to the left in FIG. 2, pushing gearwheel 9 to the left by means of its annular web 8 and accordingly pressing the plates of the clutch 18 against one another.

If, on the other hand, the recirculating ball sleeve 6 is pushed to the right, gearwheel 10 is taken along towards the right by the annular web 8, engaging multi-plate clutch 19 and establishing a driving connection between gearwheel 10 and the recirculating ball sleeve 6.

In an axial central position of the recirculating ball sleeve 6, both clutches 18 and 19 are disengaged.

Figure 3:
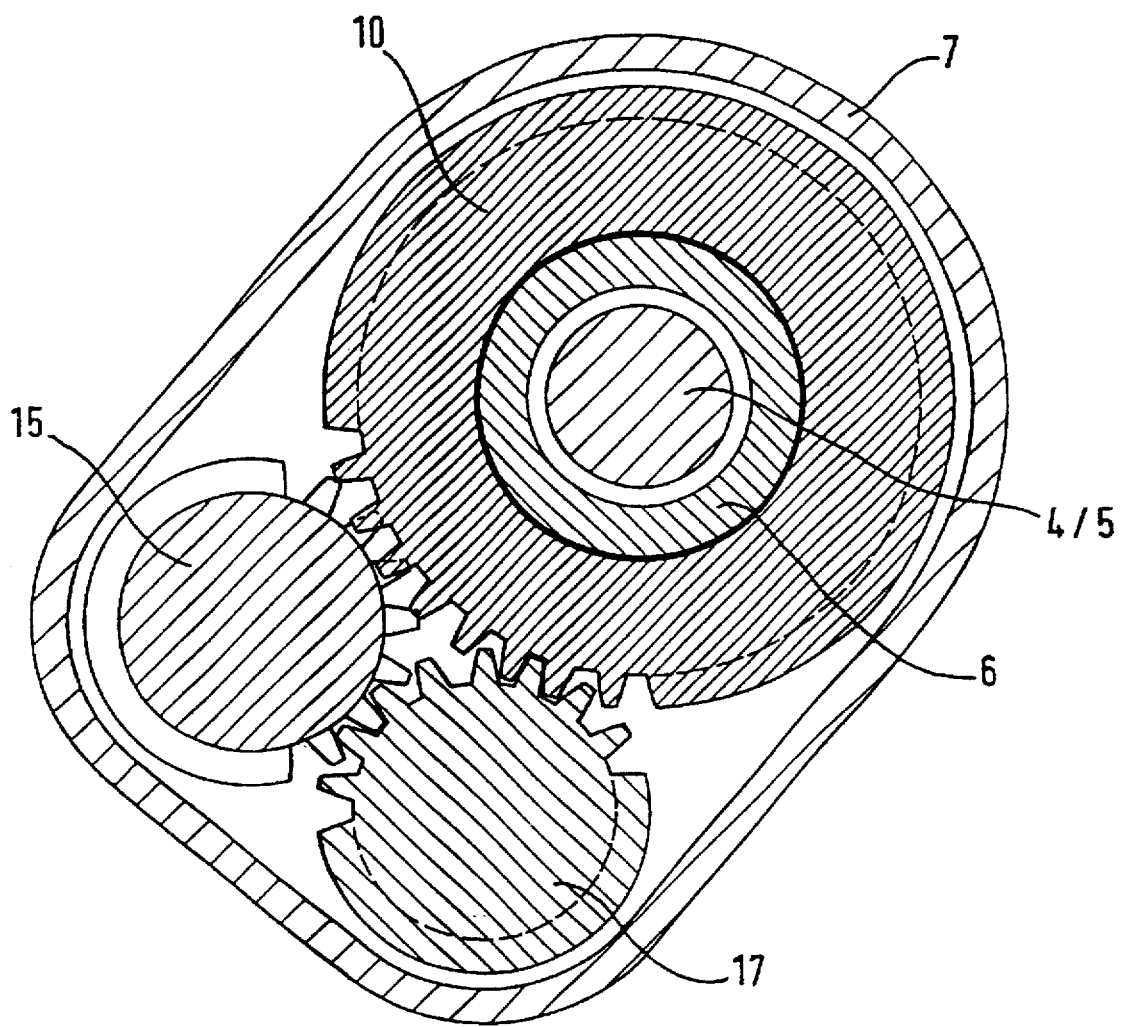
FIG. 3 is a cross-section view taken along section line III—III in FIG. 2.

The rack-and-pinion steering system shown in FIGS. 1–3 operates in the following manner. When the rack 4 is displaced axially by actuation of the steering wheel or by external forces, the recirculating ball sleeve 6 is pushed in one axial direction or the other. This has the result that one of the multiplate clutches 18 and 19 engages and establishes a driving connection between the continuously running electric motor 11 and the recirculating ball sleeve 6. A servo force which assists the respective steering movement desired by the driver is thus exerted on the rack 4 by the motor 11.

A particular advantage of the invention consists in the fact that the multi-plate clutches 18 and 19 have a very short travel, so that only slight displacements of the recirculating ball sleeve 6 are required to control the clutches 18 and 19.

The transmission of power between the screw 5 and the recirculating ball sleeve 6 furthermore takes place with extremely little friction, with the result that the respectively generated servo forces take effect in a jerk-free manner.

Since the electric motor 11 runs continuously, its kinetic energy can be used to generate servo forces in order to allow higher servo forces to be generated particularly in the case of peak loads of short duration.

The freewheel 12 ensures that the steering system remains relatively easy to operate when the electric motor 11 is stationary because it is then possible to actuate the steering system without the electric motor 11 rotating passively along with it.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A rack-and-pinion control system, comprising:
   a housing;
   a rack having arranged thereon a non-rotatable screw axially displaceable together with said rack;
   a recirculating ball sleeve interacting with said non-rotatable screw of said rack, said recirculating ball sleeve being provided with a limited ability for axial displacement;
   a frictional clutch arrangement controlled via said recirculating ball sleeve; and
   a servomotor coupled to said rack via a mechanical transmission, said servomotor continuously driving two wheels in opposite directions;

wherein said frictional clutch arrangement couples one of said two wheels to said recirculating ball sleeve depending on a direction of axial displacement of said recirculating ball sleeve, and wherein when said recirculating ball sleeve is in a central position, said frictional clutch arrangement maintains said recirculating ball sleeve uncoupled from said two wheels;

and wherein said recirculating ball sleeve includes a central web, wherein said two wheels include a first coaxial gear wheel disposed on the ball sleeve at one axial side of the central web and a second coaxial gear wheel disposed on the ball sleeve on an opposite side of the central web, and wherein said frictional clutch arrangement includes a first coaxial clutch assembly disposed on the ball sleeve in between one axial side of the housing and the first coaxial gear wheel and a second coaxial clutch assembly disposed on the ball sleeve in between an opposite axial side of the housing and the second coaxial gear wheel.

2. A rack-and-pinion control system according to claim 1, further comprising a freewheel arranged between said servomotor and said two wheels, wherein said freewheel engages when said servomotor is running.

3. A rack-and-pinion control system according to claim 1, wherein said two wheels driven in opposite directions are coaxially arranged on said recirculating ball sleeve and are drivingly connected to said recirculating ball sleeve via said frictional clutch arrangement, and wherein said frictional clutch arrangement includes multi-plate clutches, one of said multi-plate clutches being engaged when said recirculating ball sleeve is displaced in one direction and another of said multi-plate clutches being engaged when said recirculating ball sleeve is displaced in another direction.

4. A rack-and-pinion control system according to claim 2, wherein said two wheels driven in opposite directions are coaxially arranged on said recirculating ball sleeve and are drivingly connected to said recirculating ball sleeve via said frictional clutch arrangement, and wherein said frictional clutch arrangement includes multi-plate clutches, one of said multi-plate clutches being engaged when said recirculating ball sleeve is displaced in one direction and another of said multi-plate clutches being engaged when said recirculating ball sleeve is displaced in another direction.

5. A rack-and-pinion control system according to claim 1, wherein said servomotor is a rotating electric motor.

6. A rack-and-pinion control system according to claim 1, wherein said control system is a steering control system.

7. A rack-and-pinion control system according to claim 3, wherein said servomotor is a rotating electric motor.

8. A rack-and-pinion control system according to claim 3, wherein said control system is a steering control system.

9. A rack-and-pinion control system according to claim 7, wherein said control system is a steering control system.

* * * * *